United States Patent
Bashev et al.

(10) Patent No.: US 11,625,268 B2
(45) Date of Patent: Apr. 11, 2023

(54) COMPUTER-IMPLEMENTED METHOD OF INTERACTION AMONG OPERATING SYSTEM COMPONENTS AND TASKS BY MEANS OF AN INTERFACE BUS

(71) Applicant: LIMITED LIABILITY COMPANY "PEERF", Moscow (RU)

(72) Inventors: Vladimir Nikolaevich Bashev, Nizhny Novgorod (RU); Nikolay Olegovich Ilyin, Moscow (RU)

(73) Assignee: LIMITED LIABILITY COMPANY "PEERF", Moscow (RU)

( * ) Notice: Subject to any disclaimer, the term of this patent is extended or adjusted under 35 U.S.C. 154(b) by 430 days.

(21) Appl. No.: 16/939,196

(22) Filed: Jul. 27, 2020

(65) Prior Publication Data
US 2021/0034417 A1 Feb. 4, 2021

(30) Foreign Application Priority Data

Aug. 2, 2019 (RU) ................. 2019124671

(51) Int. Cl.
*G06F 9/46* (2006.01)
*G06F 9/48* (2006.01)
(Continued)

(52) U.S. Cl.
CPC ........ *G06F 9/4881* (2013.01); *G06F 9/30043* (2013.01); *G06F 9/4406* (2013.01); *G06F 9/545* (2013.01); *G06F 13/382* (2013.01)

(58) Field of Classification Search
CPC ...... G06F 9/4881; G06F 9/4406; G06F 9/545; G06F 13/382; G06F 9/448; G06F 9/4488; G06F 9/449
See application file for complete search history.

(56) References Cited

U.S. PATENT DOCUMENTS

| 5,337,413 A | 8/1994 | Lui et al. |
| 6,073,139 A * | 6/2000 | Jain ................. G06F 3/0213 |
| | | 707/999.203 |

(Continued)

FOREIGN PATENT DOCUMENTS

| EP | 0 534 662 | 12/1997 |
| EP | 1 690 186 | 7/2008 |

OTHER PUBLICATIONS

"The Component Object Model: Technical Overview ", Dec. 1994, Dr. Dobbs Journal (Year: 1994).*

(Continued)

*Primary Examiner* — Emerson C Puente
*Assistant Examiner* — Zhi Chen
(74) *Attorney, Agent, or Firm* — Nixon & Vanderhye PC

(57) ABSTRACT

This invention relates to computer engineering and operating system architecture, in particular, it discloses a new method of interaction among operating system components and tasks by means of an interface bus. It introduces OS' interface bus element being part of kernel and acting in similar way as known standard device interface bus but for all OS' components and tasks. Besides, the invention further expands the bus functions by possibility of simultaneous execution of components created for different generations of OS and its microkernels, providing for applications compatibility with any OS and microkernel versions without recompilation, saving user investments, reducing application developer software maintenance costs, and providing for OS component reuse.

This result is conditioned by the use of unique components identifiers taking into account their generations and creation of interface bus access interfaces corresponding to OS components generations. Interaction between a component and a task is performed via Interface bus by referring via a single pointer to a system interface with possibility of (Continued)

choosing any interprocess communication mechanism implemented in components; by using the marshalling mechanism between components and tasks located in various address spaces and by Interface bus expansion with other OS components.

15 Claims, 6 Drawing Sheets

(51) Int. Cl.
    *G06F 9/30*     (2018.01)
    *G06F 9/4401*     (2018.01)
    *G06F 9/54*     (2006.01)
    *G06F 13/38*     (2006.01)

(56) References Cited

U.S. PATENT DOCUMENTS

| | | | | |
|---|---|---|---|---|
| 7,353,521 | B1* | 4/2008 | Jin | G06F 9/548 |
| | | | | 719/330 |
| 9,417,931 | B2* | 8/2016 | Krishnaswamy | G06F 9/541 |
| 9,934,273 | B1* | 4/2018 | MacCarthaigh | G06F 16/285 |
| 2002/0019972 | A1* | 2/2002 | Grier | G06F 8/71 |
| | | | | 717/122 |
| 2005/0060725 | A1* | 3/2005 | D'Souza | G06F 9/44536 |
| | | | | 719/331 |
| 2005/0193392 | A1 | 9/2005 | Carusi et al. | |
| 2007/0061372 | A1* | 3/2007 | Appavoo | G06F 8/656 |
| 2007/0106996 | A1* | 5/2007 | Oddiraju | G06F 9/543 |
| | | | | 719/313 |
| 2012/0185450 | A1* | 7/2012 | Marmigere | G06F 9/44536 |
| | | | | 707/E17.005 |

OTHER PUBLICATIONS

Msatranjr, "TypeLib Table", May 31, 2018, github.com (Year: 2018).*

Chung et al., "DCOM and CORBA Side by Side, Step by Step, and Layer by Layer", May 1, 1998, https://www.researchgate.net/profile/Deron_Liang/publication/2402431_DCOM_and_CORBA_Side_by_Side_Step_by_Step_and_Layer_by_Layer/links/544972de0cf2f6388084249c/DCOM-and-CORBA-Side-by-Side-Step-by-Step-and-Layer-by-Layer.pdf, (Dec. 11, 2020), XP055759285, 24 pages.

Search Report issued in EP Appln. No. 20187690.1 dated Dec. 22, 2020.

* cited by examiner

COMPUTER-IMPLEMENTED METHOD OF INTERACTION AMONG OPERATING SYSTEM COMPONENTS AND TASKS BY MEANS OF AN INTERFACE BUS

This application claims priority to RU 2019124671 filed Aug. 2, 2019, the entire contents of which are hereby incorporated by reference.

TECHNICAL FIELD

This disclosure relates to computer engineering, in particular, to a method of interaction among operating system components and tasks by means of an interface bus.

BACKGROUND

At present there is a number of solutions describing interfaces buses.

Connection of remote components to a host processor by means of an interface bus having a limited number of address ports is known from U.S. Pat. No. 5,337,413A (TANDEM COMPUTERS INC, published on 9 Aug. 1994). The patent describes a host adapter incorporating a standard bus repeater component and an environment monitoring component. The environment monitoring component has a standard bus interface and is selectably coupled to the standard interface bus, and hence to a host processor. The host interface transceiver is coupled by means of a standard bus to the host processor, and is also selectably coupled to a drive interface transceiver by means of the standard bus. The drive interface transceiver is coupled by the standard bus to one or more storage devices. The host adapter is selectably switchable between two modes in such way, that either the drive interface transceiver is coupled through the host interface transceiver to the host processor, or the environment monitoring component is coupled to the host processor.

A prior art solution (EP1690186B1, HONEYWELL INT INC, published on 23 Jul. 2008), describing a method and apparatus for preventing potentially faulty commercial peripherals (COTS) or I/Os from disabling the bus to which they are connected is known. The apparatus has isolators coupled to the bus and the I/Os. A controller is coupled between the interfaces, a processor and memory, operating in such way, that an I/O cannot transfer data to the bus without permission from the bus. Isolation memory keeps I/O and bus messages separate. I/O messages are checked before being sent to the bus. This prevents a failed I/O or peripheral from disabling the bus.

A solution describing device interfacing in a multiprocessor computer system is also known. The solution is disclosed in patent EP0534662B1 (SUN MICROSYSTEMS INC, published on 10 Dec. 1997).

However, prior art solutions describing device interaction within operating system (OS) architecture by means of an interface bus, have a limited functionality, in particular, none of them provides for simultaneous operation of various generations of operating system components. Wherein a generation is seen as an operating system version developed as part of OS enhancement to support hardware requirements and state of the art as of the date of OS version release.

SUMMARY

This disclosure is aimed at removal of disadvantages of prior art solutions.

The technical problem the invention aims to solve is development of a new way of interaction among operating system components and tasks by means of an interface bus, which is described in the independent claims. Alternative embodiments of the present invention are described in the dependent claims.

The technical result is interface bus enhancement due to different generation OS' components concurrent operation.

It provides for interoperability of applications developed for various operating system generations and equipment, as well as interaction of system components of various generations without the need of rewriting them.

The preferred embodiment provides for a computer-implemented method of interaction between operating system' (OS) components and tasks by means of an interface bus, implemented using a computer device and comprising the following steps:

a) loading components into a memory and automatically registering them in a registry of the interface bus, wherein for each component:

I. a component record and an information about generation of said component are stored in a dynamic registry of the interface bus as UGUID (Unlimited Globally Unique Identifier) and as a pointer to a component factory of the component itself;

II. a system interface instance corresponding to said component generation is created for access to the interface bus and registered components, and an address of a system interface pointer is sent to the loaded component;

b) providing interaction between a component and a task using the system interface pointer;

c) disabling said component based on a loaded task;

d) applying marshalling for interaction between components and tasks located in different address spaces.

In a specific embodiment, the created instances of pluggable tasks and components interfaces are stored in the object pool of a system interface instance.

In another specific embodiment, an interface bus acts as a dynamic registry for the search of components loaded to memory.

In another specific embodiment, a new generation interface bus comprises/delegates or aggregates an older generation interface bus.

In another specific embodiment, an interface bus has a modular structure and an option of expansion at the account of other OS components.

Another preferred embodiment of the invention is a system, comprising
at least one processor;
at least one memory, which contains machine-readable instructions which, when executed by the at least one processor, are effective in executing an operating system (OS) comprising an interface bus for communication between components and tasks of the OS via method described above.

BRIEF DESCRIPTION OF THE DRAWINGS

The embodiment of the invention will be described hereinafter in accordance with the accompanying drawings, which are presented to illustrate the essence of the invention and in no way limit the scope of the invention. The following drawings are attached to the application.

DETAILED DESCRIPTION OF THE INVENTION

The following detailed description of the embodiment of the invention comprises multiple embodiment details providing for clear understanding of the present invention. Due to the fact that those skilled in computer system operation and design are familiar with common terms, components and procedures, such methods, names and components are not described in details not to obscure specific features of the present invention and its application options.

Besides, it is apparent from the given explanation that the invention extends beyond the described embodiment. Multiple potential modifications, changes, variations and replacements maintaining the essence and form of the present invention will be evident for domain experts.

The present invention is aimed at creation of a computer-implemented method of interaction among operating system' components and tasks by means of an interface bus.

In the claimed solution, OS architecture is based on an interface bus used for components data exchange.

Since the OS architecture utilizes entirely interface-based interaction, the bus data comprises only pointers to components' interfaces; the bus neither utilizes, nor supports any other data types, therefore, it is an interface bus.

Wherein, in accordance with the claimed solution, there is no need in data exchange buffer creation, it is enough to send a single pointer to an interface. An exception to the above is when components are located in different address spaces; in this case the marshalling mechanism-interface data transformation to a correct transmission format is used.

For efficient interaction, an interface bus acts as a dynamic registry for the search of components loaded to random access memory. For search and on-demand loading of other components, the interface bus uses auxiliary components, such as a file manager for file system components, or a network manager for loading components from remote resources.

In addition, an auxiliary Remote Procedure Call (RPC) component, if any, provides for registration of components located at remote computer devices in the bus registry using the resources of such devices.

Another important task solved by the claimed interface bus is different generations' components communication. Using Adapted Component Object Model (similar to COM by Microsoft) technology of component reusability, a second-generation interface bus for 32-bit processor architecture comprises a first-generation interface bus for 16-bit processor architecture. Since an external component controls the internal component' interfaces, the marshalling mechanism is required for correct and transparent operation.

Figure 1:
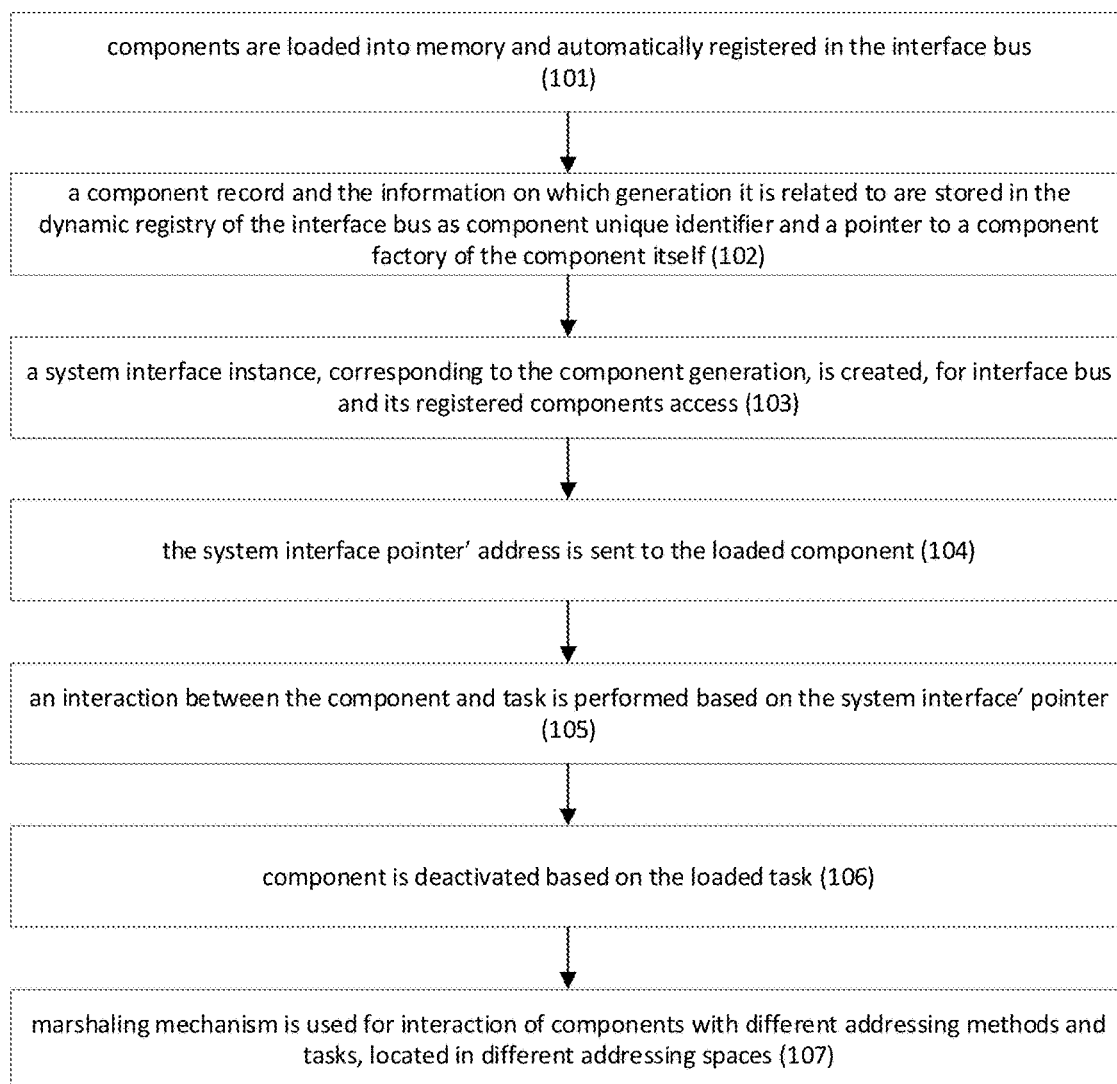
FIG. 1 shows an interface bus.

FIG. 1 shows a computer-implemented method (100) of interaction between operating system components and tasks by means of an interface bus, implemented using a computer device. Such components may include a memory manager, a device manager, a file manager, etc.

At step (101) components are loaded to memory and automatically registered in an interface bus. Wherein, at step (102) a component record and the information on which generation it is related to is stored in the dynamic registry of the interface bus in the form of UGUID (Unlimited Globally Unique Identifier) and a pointer to component factory of the component itself.

The UGUID identifier consists of three parts:
a preamble (determines the space allocated to a data length value);
a data length;
data itself (unique identifier) generated in accordance with the standard, RFC 4122.

Since the standard provides for 128-bit unique identifier length, the upper part is cut off for the unlimited, for example, 64-bit unique identifier format.

The second example for a 256-bit unlimited unique identifier format: two 128-bit identifiers are generated as per the standard, RFC 4122 and integrated in a 256-bit identifier.

The third example shows the difference between the UUID={96EBAA04-7B4E-4BDE-914D-8C3C57F48F2F} generated as per the standard, RFC 4122, applied in the COM technology by Microsoft:
static const GUID IID_IX={0x96ebaa04, 0x7b4e, 0x4bde, 0x91, 0x4d, 0x8c, 0x3c, 0x57, 0xf4, 0x8f, 0x2f};
and UGUID applied in the Adapted Component Object Model:
static const UGUID IID_IX={0x01, 0x10, 0x96ebaa04, 0x7b4e, 0x4bde, 0x91, 0x4d, 0x8c, 0x3c, 0x57, 0xf4, 0x8f, 0x2f};
where the first byte 0x01 is the preamble, the second byte 0x10 is the data length, and the remaining 16 (0x10) bytes are the unique identifier.

Then at step (103) an instance for a system interface corresponding to the component generation is created for interface bus and its registered components access, the system interface pointer' address being sent to the loaded component (104).

At step (105) the component and the task interact on the basis of the system interface' pointer.

At step (106) the respective component is disabled in accordance with the loaded task.

The marshalling mechanism is applied for the purpose of interaction between components with different address-mapping and tasks located in different address spaces (at stage 107).

Below is the example of a marshaling mechanism application case:
in case of different addressing methods and bit number, i.e. depending on the central processor operation mode;
in case of different addressing methods and storage organization; here another address space is meant, for example, page memory (virtual storage arrangement), when components are isolated from one another.

Figure 2:
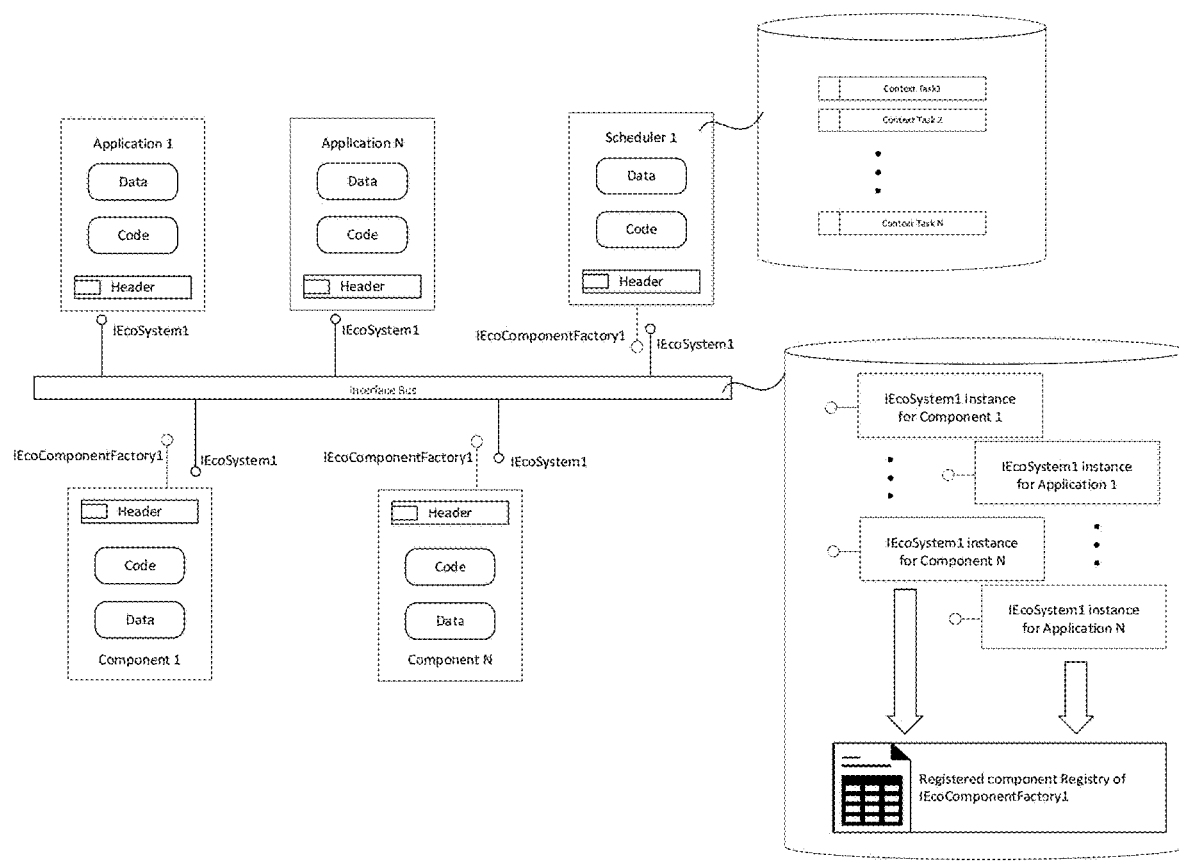
FIG. 2 shows an object pool.

FIG. 2 shows an interface bus reflecting interaction among components and tasks. The interface bus is a link between the components and the tasks.

The interface bus registry contains information only on the components located in the memory. The component registry has a limited capacity. To extend the interface bus registry capacity, a memory manager is loaded by a loader and registered in the interface bus registry. File system components are loaded by a file manager. If the file system components are used, the loader has to load the file manager to the system memory and register it in the interface bus register.

Figure 3:
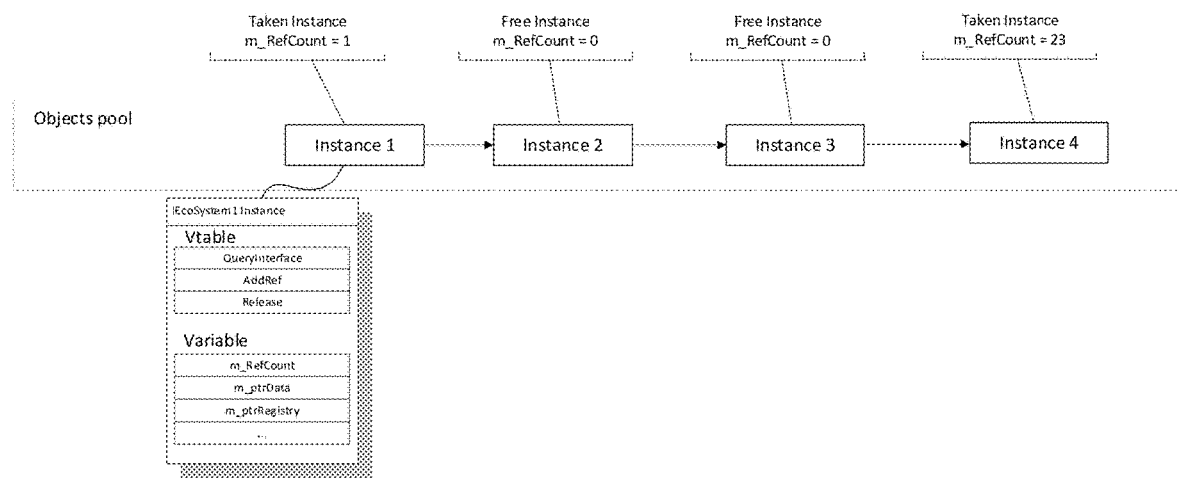
FIG. 3 shows an interface bus operation algorithm.
Figure 4:
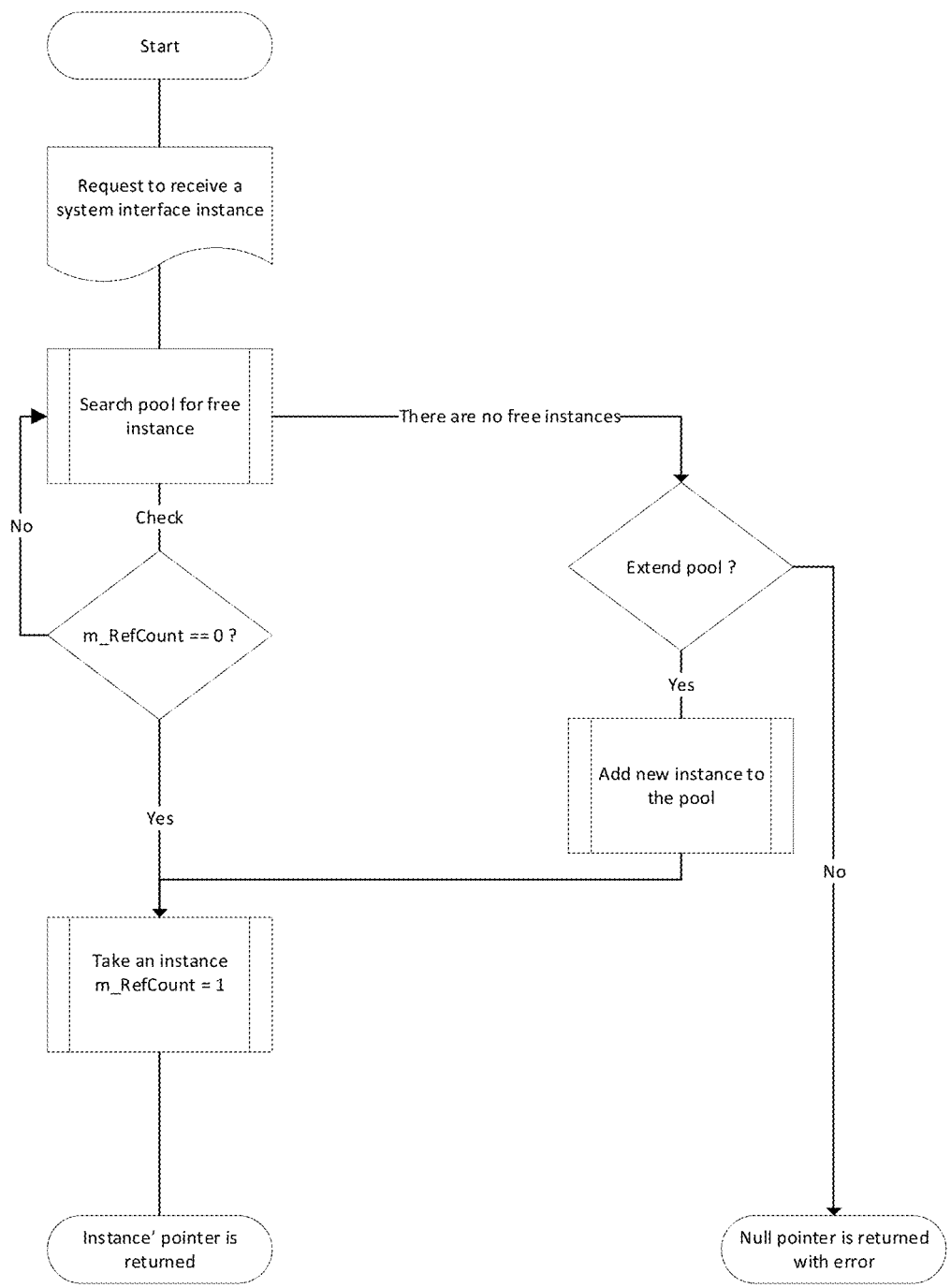
FIG. 4 shows an interprocess communication option.

Two operations are performed when a component is loaded to the memory and registered in the interface bus:
a component record and the information on which generation it is related to are stored in the dynamic registry of the interface bus as UGUID (Unlimited Globally Unique Identifier) and a pointer to component factory of the component itself
a free instance for the system interface shown in FIG. 3, corresponding to the component generation is created (captured) in accordance with the algorithm shown in FIG. 4 for interface bus and its registered components access, the system interface pointer' address is being sent to the loaded component.

Thus, the loaded component can request other components interfaces.

When a task (specific application) is loaded to memory, a new system interface instance shown in FIG. 3 is created (captured) in the interface bus. In accordance with the algorithm for interface bus and registered components access shown in FIG. 4, the system interface pointer' address is sent to the task. The operations of component registration/deregistration and creation (capture)/release of system interface instances should be atomic, which is conditioned by interface bus specifications. A system interface can be conventionally called an interface bus connection point.

System interface instances for components and tasks are stored in the object pool of interface bus (shown in FIG. 3) without processor time being spent on object (interface) creation and destroying, except the case when both there is no free objects in the pool and pool extension is allowed by configuration. In such case the newly created instances are stored in the extended parts of the pool. It should be emphasized that the interface bus does not have its own task (process) for instance creation (capture)/release. All these operations are performed at the account of own processor time of the scheduled tasks themselves.

Figure 5:
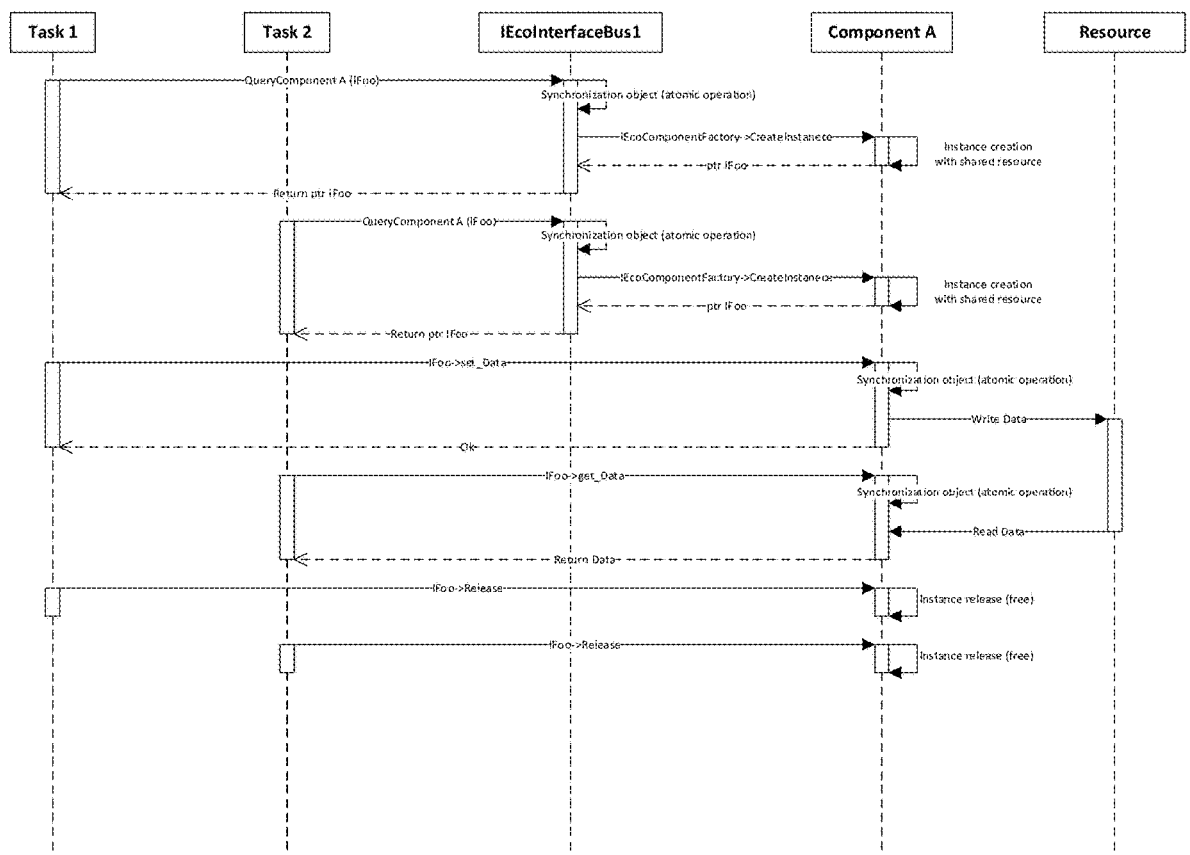
FIG. 5 shows an interprocess communication option.
Figure 6:
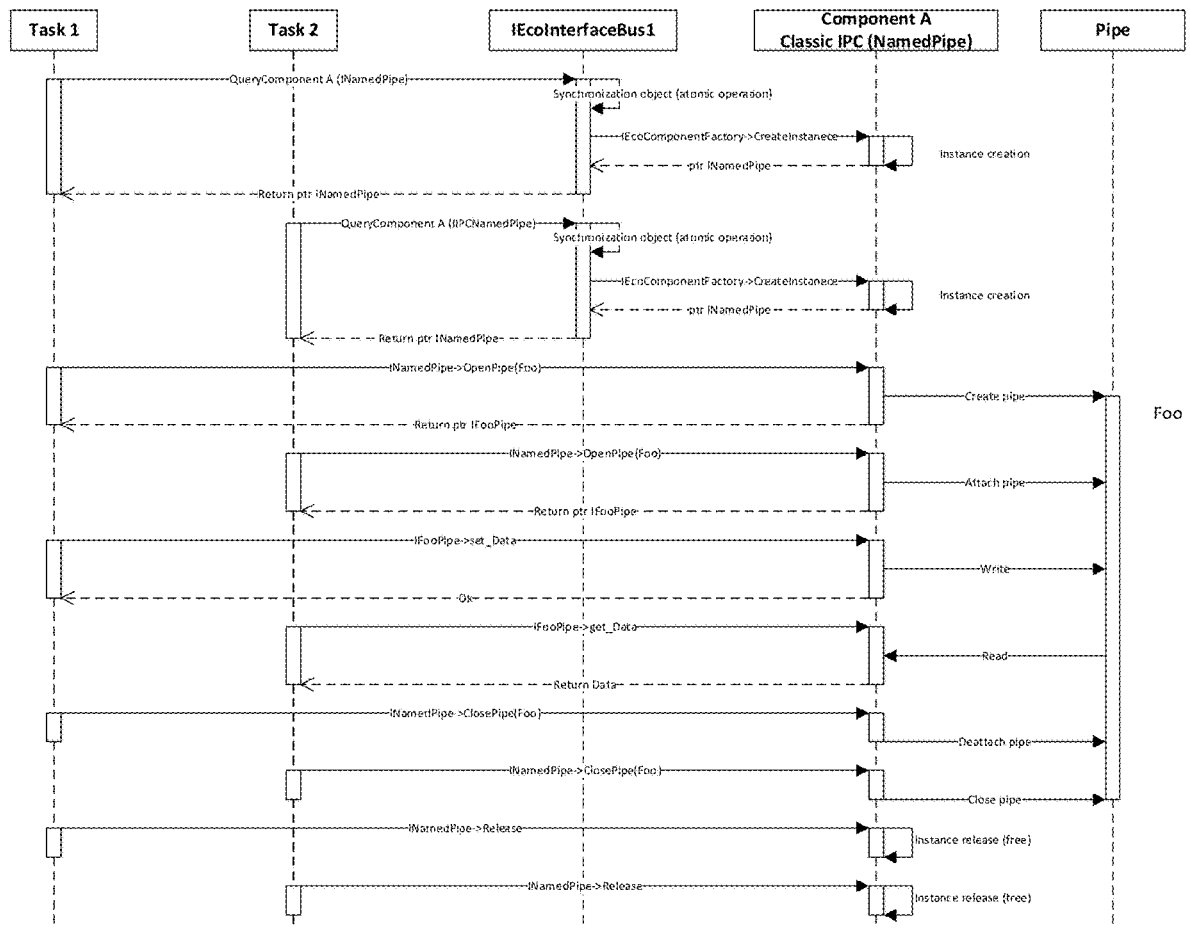

FIG. 5 and FIG. 6 show interprocess communication options. The sequence diagrams show the process of instance creation and release.

The algorithm of getting a system interface' pointer is shown in FIG. 4.

To create a new task, a system interface' pointer is required; to get it, an initiating task requests a system interface' pointer from an interface bus. Having received a free instance, the initiating task increases object's reference count. When branching to a new task, the new task, in its turn, also increases object's reference count. After the new task is successfully created, the initiating task, depending on the required solution, can decrease new task system interface instance reference count.

If the initiating tasks is completed earlier than the created task, it has to decrease task' system interface instance reference count before it is completed.

Thus, the entire interaction between components and tasks is limited by a transfer of a single system interface pointer, through which components or tasks can get access to requested interfaces.

It should be noted that a component or a task has its own pointer to a system interface instance. Then, depending on the type and requirements of the problems to be solved, when the mentioned approach of interprocess communication subtype is not enough, a developer is not limited in interprocess communication methods, i.e. components for operation of sockets, channels (see example in FIG. 6), signals, synchronization mechanisms, etc. can be registered in an interface bus.

By requesting through a single system interface pointer, a developer can choose any interprocess communication mechanism implemented in components. This differs to a great extent from the QNX OS approach, where interprocess communication is arranged via messages (byte packets) at the microkernel level, so, to transfer an object, it has to be serialized first, and then it is necessary to deserialize the data. In the claimed solution, the component approach is arranged as a construction kit, requiring an intermedium, represented by an interface bus having a modular structure with the option of expansion at the account of other OS components, including, but not limited to a Memory Manager, a File Manager or a Network Manager for remote components access.

FIG. 4 shows the algorithm of system interface transfer to a task and component using the pool object shown in FIG. 3.

This algorithm is improved in terms of execution time, since it does not spend any processor time on memory allocation and deallocation for system interface instances (objects). It is also based on the components' property of own lifetime management by using references' counter.

Reference count for a system interface is all that is needed for retaining an instance in memory. A task and a component do not release a system interface' pointer until complete working with it. Basing on this property, references' count, the algorithm shown in FIG. 4, consists of the following steps:

1) requesting a system interface pointer, for a new component instance or task;
2) searching for a free object for system interface data for a new task or component instance in the objects pool:
    if an object has a zero reference count, i.e. the object is free, the object capture process is initiated;
    if there is no free object in the pool, there is no object with a zero reference count, i.e. all the object are not free (taken), either of two solutions is possible:
a) to reject the request, if the pool extension is not supported, to return a null pointer with an error code;
b) to allocate a memory unit to a new object, if the pool extension is supported, to start object capture;
3) object capture consists in object data initialization and references' count increase by one, i.e. the object become not free/taken;
4) the new task or component interface gets the system interface pointer providing access to the interface bus and registered components.

The sequence diagram example in FIG. 5 shows access to a shared resource provided by "Component A".

Task 1 and Task 2 request via the interface bus the IFoo interface of "Component A" providing access to the shared resource. The interface bus, in its turn, refers to the component registry in order to find the requested component. After the search is completed, the interface bus via "Component A" factory interface creates IFoo interface data object instance for the task. Having received pointers to "Component A" IFoo interface via the interface bus, Task 1 and Task 2 interact directly with "Component A" providing the shared resource.

In the event that the tasks are in different address spaces, the marshalling mechanism is applied.

Synchronization of access to the shared resource is performed by "Component A" itself. Thus, Task 1 and Task 2 can easily perform reading and writing operations without resorting to additional synchronization mechanisms.

The sequence diagram example in FIG. 6 shows data exchange via a named pipe provided by "Component A".

Task 1 and Task 2 request INamedPipe interface of "Component A" via an interface bus. The process of getting interface via the interface bus is the same as that for the example in FIG. 5.

Via the obtained INamedPipe interface, the tasks open the Foo named pipe (interprocess communication method), whereat the pointer to the IPipe interface used for data exchange between the tasks is returned. Upon completion, the tasks are disconnected from the named pipe, and it is deleted, when none of the tasks uses it.

These examples show various interprocess communication methods for data exchange, which can be implemented as components, and an interface bus is also a kind of interprocess communication subtype providing component interfaces to tasks.

For communication between various component generations, the IEcoSystem* (*-generation number) interface is used by an interface bus.

For each microkernel generation, a system interface has its own unique identifier (UGUID), i.e. a particular system interface is or will be determined for each microkernel generation, depending on the technical capacity, for example, IEcoSystem1 (1-st generation), IEcoSystem2 (2-nd generation), IEcoSystem3 (3-rd generation), etc., each having its own UGUID. Thus, when a task or a component requests a system interface for the generation of the kernel, the solution was developed for, via an interface bus of the previous or earlier generation, the interface bus via QueryInterface determines the requested system interface generation on the basis of UGUID.

Depending on the technical capacity (computer architecture) and interface bus implementation, i.e. the application of reusability, aggregation or containment mechanisms, the interface bus conveys a request to the interface bus of the previous generation, which, in its turn, determines, if the requested system interface corresponds to the generation of the microkernel the request was readdressed to. If successful, the respective system interface returns to the requested component or task. In other words, in accordance with the claimed solution, a new generation interface bus contains or aggregates an earlier generation interface bus. Then the task or component interacts with the microkernel of its generation.

It should be noted that a number of solutions require support of program applications developed for earlier OS generations (microkernel generations), but a need arises to use applications developed for a new OS generation (microkernel generation) simultaneously, i.e. in conjunction with supported solution for the earlier OS generation. A pointer to the external component of the new generation is known to the aggregated interface bus of an earlier generation. Due to this option, supported solutions of earlier microkernel generations launched under new generation microkernel control can request interfaces of components developed for new microkernel tasks via an interface bus. So, both new generation components or tasks can use earlier generation components, and earlier generation components and tasks can use new generation components interacting via an interface bus.

The present application materials contain the preferred embodiment of the technical solution, which should not be used as limiting other, private embodiments, which do not go beyond the scope of the requested legal protection and are obvious to domain experts.

The invention claimed is:

1. A computer-implemented method for interaction among components and tasks of an operating system (OS) via an interface bus of a computer device, the method comprising:
   a) loading components into memory and registering those components with the interface bus, wherein the registration of each component includes:
      a component record and information about a generation of the respective component being stored in a dynamic registry of the interface bus as an Unlimited Globally Unique Identifier (UGUID) and as a pointer to a component factory of the respective component;
      a system interface instance of the interface bus having a generation and corresponding to the generation of the respective component being created, and a pointer to the system interface instance being sent to the corresponding loaded component as a corresponding entry-point to query interfaces of the interface bus and other registered components;
   b) providing client-server interaction between a client component or task and other components using a pointer to a corresponding system interface instance to enable the client to query the interface of the interface bus of a specified generation, the client, upon receiving a corresponding query, querying the interface of another component from the interface bus to return to the client the pointer to a requested interface;
   c) unregistering an unused component in the interface bus via a loaded task; and
   d) applying marshalling for interaction between components and tasks located in different address spaces.

2. The method of claim 1, wherein created instances of system interface of the interface bus are stored in a pool of objects of the interface bus.

3. The method of claim 1, wherein the interface bus of a new generation comprises the interface bus of an early generation via containment or aggregation programming mechanisms.

4. The method of claim 1, wherein the interface bus has a modular structure and is expandable using capabilities of other components of the OS.

5. A system comprising:
   at least one processor;
   at least one memory, which includes machine-readable instructions which, when executed by the at least one processor, are effective in executing an operating system (OS), comprising an interface bus for communication among components and tasks of the OS, by performing operations comprising:
      a) loading an OS kernel;
      b) loading of an interface bus component provided that the interface bus component is not part of the kernel;
      c) loading other components into memory and registering those components with in the interface bus, wherein the registration of each component includes:
         a component record and information about a generation of the respective component being stored in a dynamic registry of the interface bus as an Unlimited Globally Unique Identifier (UGUID) and as a pointer to a component factory of the respective component;
         a system interface instance of the interface bus having a generation and corresponding to the generation of the respective component being created, and a pointer to the system interface instance being sent to the corresponding loaded component as a corresponding entry-point to query interfaces of the interface bus and other registered components;
      d) providing client-server interaction between a client component or task and other components using a pointer to a corresponding system interface instance to enable the client to query the interface of the interface bus of a specified generation, the client, upon receiving a corresponding query, querying the interface of another component from the interface bus to return to the client the pointer to a requested interface;
e) applying marshalling for interaction between components and tasks located in different address spaces; and
f) unregistering an unused component in the interface bus via a loaded task.

6. The system of claim 5, wherein created instances of system interface of the interface bus are stored in a pool of objects of the interface bus.

7. The system of claim 5, wherein the interface bus of a new generation comprises the interface bus of an early generation via containment or aggregation programming mechanisms.

8. The system of claim 5, wherein the interface bus has a modular structure and is expandable using capabilities of other components of the OS.

9. The method of claim 6, wherein two tasks can interact through a shared resource provided by the same instance of component, requested from the interface bus.

10. The method of claim 1, wherein two tasks can interact through a shared resource provided by the same instance of component, requested from the interface bus.

11. A non-transitory computer readable storage medium including machine-readable instructions which, when executed by at least one processor, are effective in executing an operating system (OS), comprising an interface bus for communication among components and tasks of the OS, by performing operations comprising:
a) loading an OS kernel;
b) loading of an interface bus component provided that that interface bus component is not part of the kernel;
c) loading other components into memory and registering those components with in the interface bus, wherein the registration of each component includes:
a component record and information about a generation of the respective component being stored in a dynamic registry of the interface bus as an Unlimited Globally Unique Identifier (UGUID) and as a pointer to a component factory of the respective component;
a system interface instance of the interface bus having a generation and corresponding to the generation of the respective component being created, and a pointer to the system interface instance being sent to the corresponding loaded component as a corresponding entry-point to query interfaces of the interface bus and other registered components;
d) providing client-server interaction between a client component or task and other components using a pointer to a corresponding system interface instance to enable the client to query the interface of the interface bus of a specified generation, the client, upon receiving a corresponding query, querying the interface of another component from the interface bus to return to the client the pointer to a requested interface;
e) applying marshalling for interaction between components and tasks located in different address spaces; and
f) unregistering an unused component in the interface bus via a loaded task.

12. The non-transitory computer readable storage medium of claim 11, wherein created instances of system interface of the interface bus are stored in a pool of objects of the interface bus.

13. The non-transitory computer readable storage medium of claim 11, wherein the interface bus of a new generation comprises the interface bus of an early generation via containment or aggregation programming mechanisms.

14. The non-transitory computer readable storage medium of claim 11, wherein the interface bus has a modular structure and is expandable using capabilities of other components of the OS.

15. The non-transitory computer readable storage medium of claim 11, wherein two tasks can interact through a shared resource provided by the same instance of component, requested from the interface bus.

* * * * *